(12) United States Patent
Zhang

(10) Patent No.: US 6,928,120 B1
(45) Date of Patent: Aug. 9, 2005

(54) METHODS AND APPARATUS FOR USE IN REDUCING RESIDUAL PHASE ERROR IN OFDM COMMUNICATION SIGNALS

(75) Inventor: Hongliang Zhang, Redmond, WA (US)

(73) Assignee: Cingular Wireless II, LLC, Atlanta, GA (US)

(*) Notice: Subject to any disclaimer, the term of this patent is extended or adjusted under 35 U.S.C. 154(b) by 928 days.

(21) Appl. No.: 09/670,286

(22) Filed: Sep. 25, 2000

(51) Int. Cl.$^7$ ............................................. H04L 27/28
(52) U.S. Cl. ...................... 375/260; 375/148; 375/267; 375/347; 370/464
(58) Field of Search ................... 375/260, 261, 375/267, 284, 341, 347, 348, 326, 344, 148; 370/464, 208

(56) References Cited

U.S. PATENT DOCUMENTS

| | | | |
|---|---|---|---|
| 5,017,883 A | 5/1991 | Divsalar et al. ............. | 329/304 |
| 5,140,615 A * | 8/1992 | Jasper et al. ................. | 375/347 |
| 5,369,670 A | 11/1994 | Zagloul et al. ................ | 375/84 |
| 5,471,464 A | 11/1995 | Ikeda ........................... | 370/19 |
| 5,712,877 A | 1/1998 | Ho et al. ....................... | 375/284 |
| 5,787,123 A | 7/1998 | Okada et al. ................. | 375/324 |
| 5,796,786 A * | 8/1998 | Lee .............................. | 375/326 |
| 5,809,083 A * | 9/1998 | Wright ......................... | 375/285 |
| 6,496,534 B1 * | 12/2002 | Shimizu et al. ............. | 375/148 |

FOREIGN PATENT DOCUMENTS

| | | | |
|---|---|---|---|
| EP | 0 859 494 A2 | 8/1998 | |
| EP | 1133093 A1 * | 12/2001 | ............ H04J/11/00 |
| FR | 2 721 778 A1 | 12/1995 | |

OTHER PUBLICATIONS

Written Opinion, for PCT/US01/26621, dated Feb. 25, 2003.
ISR for PCT/US01/26621 (3 pages).

* cited by examiner

Primary Examiner—Shuwang Liu (57) ABSTRACT

Methods and apparatus for use in reducing residual phase error (RPE) in orthogonal frequency division multiplexed (OFDM) communication signals are described. One method includes the steps of calculating a phase of each one of a plurality of channel-compensated data symbols to generate a plurality of data symbol phases; performing a hard-decision on each one of the plurality of channel-compensated data symbols to estimate a plurality of information symbols; calculating a phase of each one of the plurality of information symbols to generate a plurality of information symbol phases; calculating a phase difference between each data symbol phase and its associated information symbol phase to generate a plurality of phase differences; and determining a residual phase error based on the plurality of phase differences.

21 Claims, 8 Drawing Sheets

METHODS AND APPARATUS FOR USE IN REDUCING RESIDUAL PHASE ERROR IN OFDM COMMUNICATION SIGNALS

BACKGROUND OF THE INVENTION

1. Field of the Invention

The present invention relates generally to the field of radio communication receivers. More particularly, the present invention relates to the field of reducing residual phase error (RPE) of orthogonal frequency division multiplexing (OFDM) signals in OFDM communication receivers.

2. Description of the Related Art

An increasing need for broadband mobile/fixed wireless communications services has motivated researchers and radio engineers to search for a variety of feasible radio airlink interface techniques for such wireless communication systems. An airlink interface technique based on the Orthogonal Frequency Division Multiplexing (OFDM) modulation is considered an attractive candidate for a broadband wireless transmission system due to its spectral efficiency, its robustness in different multipath propagation environments and its ability to combat intersymbol interference (ISI).

OFDM is a multi-carrier modulation method. It divides an entire frequency band into many, say N, subchannels or frequency tones, and each subchannel is modulated with a constellation symbol to be transmitted. In its application as a multiple access method for a point-to-multipoint wireless communication system, OFDM arranges these total N subchannels as follows. M adjacent subchannels are grouped together (where M<<N) without overlapping between adjacent groups. Each mobile user is assigned a cluster of M subchannels when it needs to transmit information data between its serving base station and its terminal. In each cluster of M subchannels assigned to an individual user, one or more subchannels may be used to transmit pilot signals and are called "pilot subchannels." The rest of the subchannels bear information data and are called "information subchannels." For an available bandwidth of B MHz, there are total of N subchannels with a frequency space of B/N MHz; this band can simultaneously support N/M users.

An OFDM-based wireless system, however, is very sensitive to channel phase errors and the phase noise of the receiver local oscillator (LO). Therefore, an effective fading channel estimation and the transform domain channel compensation become necessary to restore OFDM signal orthogonality, to correct phase error, and to conduct coherent demodulation in the receiver.

Pilot symbol-aided approaches are widely used to estimate the fading channel properties which corrupt the transmitted signal. In an OFDM/TDMA system, an OFDM data block is the block of M constellation symbols to be transmitted within a TDMA time slot. When the transmission channel or phase noise changes significantly from one OFDM data block to the next, channel estimation and transform domain channel compensation must be performed in each individual data block with the pilot symbols inserted in the given data block. For example, the interval between two OFDM data blocks may be on the order of 3–5 milliseconds. In such a relatively long time period, the phase noise effect of the receiver LO may change significantly.

Co-channel interference due to any frequency reuse pattern, multipath fading, and additive white Gaussian noise (AWGN) are primary constraints to an acceptable performance in a cellular/wireless communication system. In addition, intercarrier interference (ICI) due to channel variation and phase noise always exists in an OFDM-based wireless system. Thus, the pilot symbols as well as the information symbols are corrupted by co-channel interference, intercarrier-interference, noise, and other channel impairments. All of these impairments in the received pilot signals significantly affect the accuracy of the channel estimation. A residual phase error (RPE) is the phase error that remains after the received constellation symbols are compensated based on an inaccurate channel estimation.

With conventional techniques, the accuracy of the channel estimation may be improved by either increasing the number of pilot signals and/or increasing their transmission power. On one hand, using a larger number of pilot symbols results in a higher transmission overhead and hence a lower system capacity. On the other hand, a larger transmission power for pilot sub-channels results in larger ICIs for information-bearing tones and hence causes implementation difficulties. Accordingly, there is an existing need to reduce the residual phase error in OFDM communication signals without the deficiencies of the prior art.

SUMMARY OF THE INVENTION

Methods and apparatus for use in reducing the residual phase error (RPE) in OFDM communication signals are described. A pilot symbol-aided channel estimation scheme is employed in a wireless OFDM system. The new technique takes advantage of OFDM-based systems where a block of constellation symbols are transmitted simultaneously and all of these symbols experience the same channel fading. Broadly, the technique utilizes a block of detected symbols, based on their hard-decisions as the real transmitted symbols, to estimate and remove the residual phase error after the channel has been compensated.

The method of the preferred embodiment includes the steps of generating a plurality of channel-compensated data symbols by performing channel compensation on OFDM communication signals using one or more pilot tones; calculating a phase of each one of the plurality of channel-compensated data symbols to generate a plurality of data symbol phases; performing a hard-decision on each one of the plurality of channel-compensated data symbols to estimate a plurality of information symbols; calculating a phase of each one of the plurality of information symbols to generate a plurality of information symbol phases; and calculating a phase difference between each data symbol phase and its associated information symbol phase to generate a plurality of phase differences. The preferred method may include the further steps of selecting a subset of phase differences from the plurality of phase differences that does not include one or more of the largest values in the plurality of phase differences; using the subset of phase differences to generate an average phase difference; determining a residual phase error based on the average phase difference; and correcting phases of channel compensated data symbols based on the residual phase error.

DETAILED DESCRIPTION OF THE PREFERRED EMBODIMENTS

Figure 1:
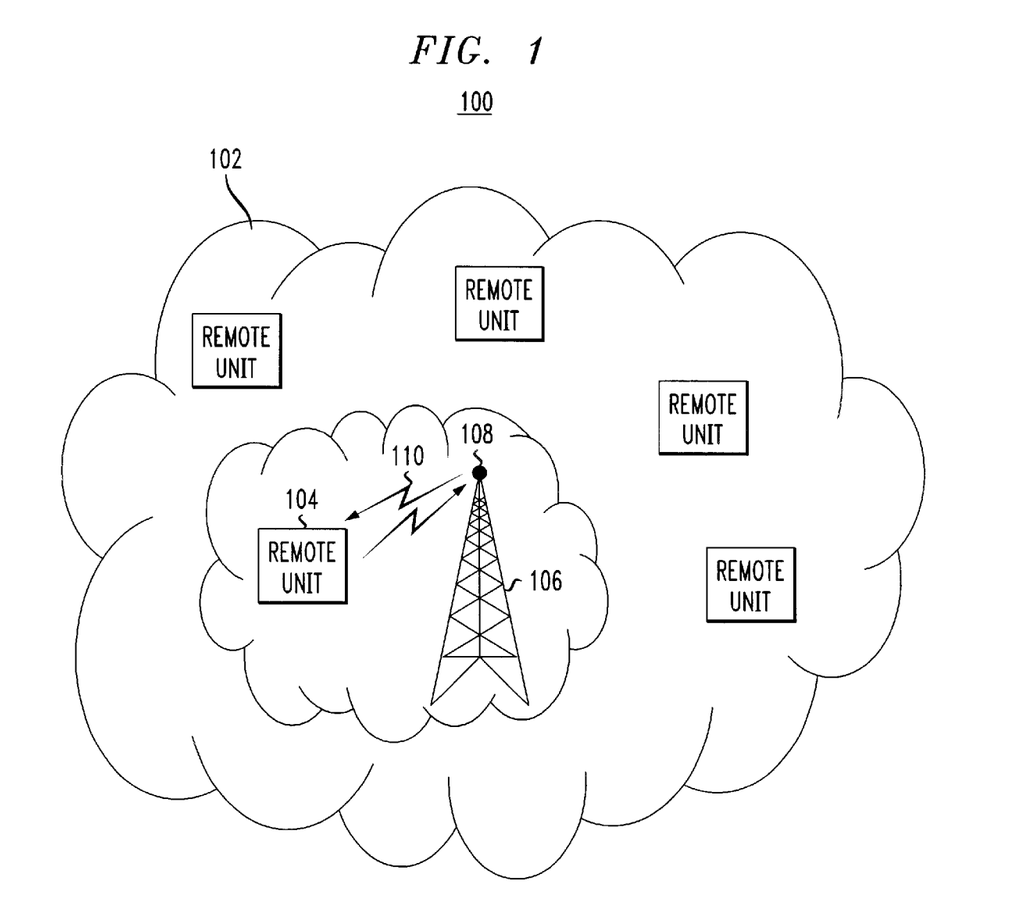
FIG. 1 is a diagram of a wireless communication system, such as a fixed wireless system utilizing orthogonal frequency division multiplexing (OFDM) communication techniques, which includes one or more base units and one or more remote units.

FIG. 1 is an illustrative representation of a wireless communication system 100 which utilizes orthogonal frequency division multiplexing (OFDM) or OFDM-like communication methodologies. Wireless communication system 100 includes at least one base unit 106 having one or more antennas 108, and a plurality of remote units 102 ("RUs" or "transceiver units"), such as remote unit 104. Base unit 106 and remote units 102 communicate via radio frequency (RF) signals, such as RF signals 110 between base unit 106 and remote unit 104. Wireless communication system 100 can make use of a number of different communication techniques, such as frequency division multiple access (FDMA), time division multiple access (TDMA), or time division duplex (TDD).

Preferably, wireless communication system 100 is a "fixed wireless system" (FWS) or Digital Broadband service, where base unit 106 provides telephone and high-speed data communication to each one of a number of fixed-location subscribers equipped with an RU. Also, the RF OFDM communications signals are modulated using 16 quadrature amplitude modulation (QAM), or quadrature phase shift keying (QPSK). Further, the wireless system employs a frequency division duplex (FDD) technique to implement the downlink (base unit to remote unit) and uplink (remote unit to base unit) transmissions. Since uplink and downlink transmissions are symmetric, only downlink transmission will be described herein.

Figure 8:
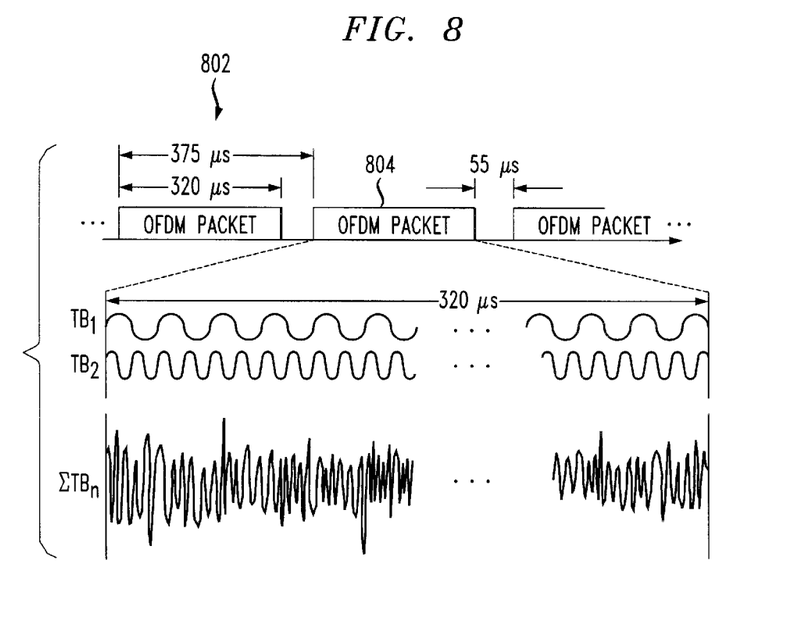
FIG. 8 is a timing diagram showing radio frequency (RF) OFDM signals and OFDM packets in the wireless communication system.
Figure 9:
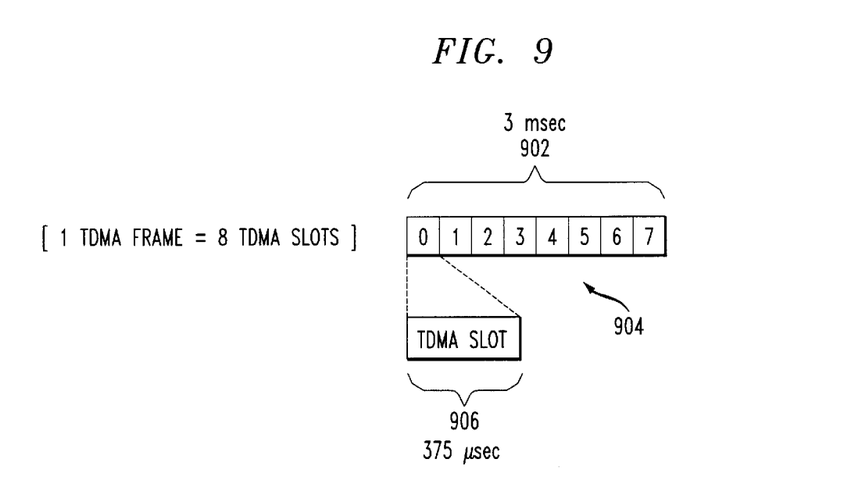
FIG. 9 is an illustrative representation of the relationship between time slots and time frames utilized in the wireless communication system.

Referring to FIG. 8, each base unit of the wireless communication system transmits a plurality of OFDM packets 802, such as an OFDM packet 804, to a corresponding remote unit. A new OFDM packet is transmitted once every predetermined time period. Each predetermined time period is associated with a time slot, such as a time slot 906 of FIG. 9. As indicated in FIG. 9, a plurality of consecutive time slots 904 corresponds to a time frame 904. In the embodiment shown, each time slot has a duration of 375 microseconds, each OFDM packet is 320 microseconds in length, and each time frame corresponds to 8 time slots for a duration of 3 milliseconds.

Figure 10:
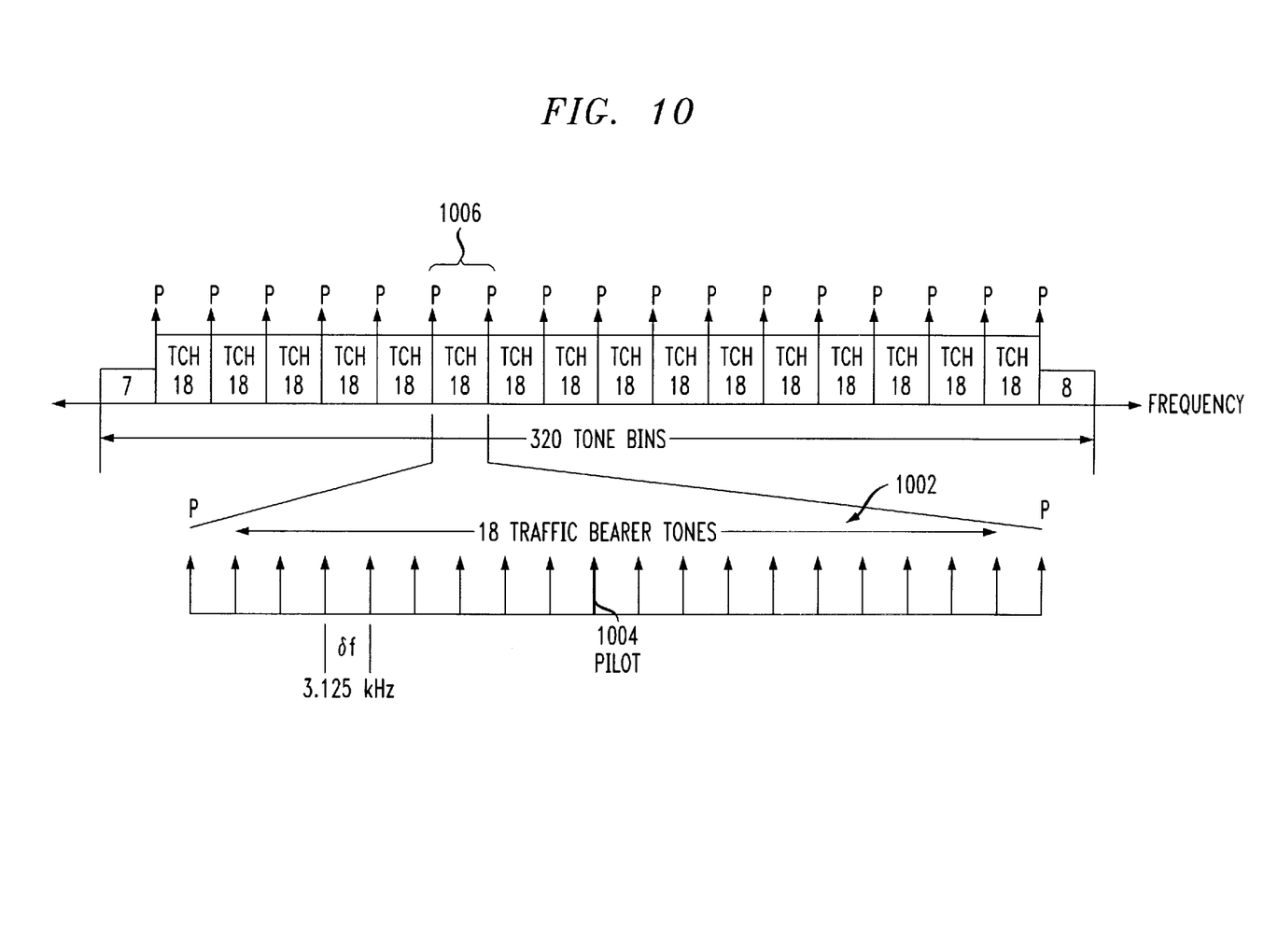
FIG. 10 is an illustrative representation of the frequency layout of traffic and pilot tones utilized in the wireless communication system.

Each base unit transmits "traffic tones" and "pilot tones" to a corresponding remote unit. Traffic tones are utilized for the communication of voice and/or data, whereas pilot tones are utilized for channel compensation. In general, each remote unit samples the OFDM waveforms at a sampling rate to generate time domain samples, and converts the time domain samples into frequency domain signals (e.g., traffic or pilot tones). Referring to FIG. 10, an illustrative representation of the frequency layout of traffic and pilot tones utilized in the wireless communication system is shown. Data symbols on traffic tones ("Tch") of a particular frequency slot are transmitted in a particular time slot. For example, data symbols on traffic tones 1002 of frequency slot 1006 are transmitted in one particular time slot. As indicated in FIG. 10, each frequency slot has eighteen traffic tones. One or more of these tones, such as a tone 1004, are used as pilot tones for channel estimation and compensation.

Each remote unit is assigned a traffic channel that is defined by a unique time and frequency slot combination. One remote unit may be assigned to receive information within, for example, each time slot $t_0$ (e.g., time slot 906 of FIG. 9) at frequency slot $f_5$ (e.g., a frequency slot 1002 of FIG. 10), while another remote unit may be assigned to receive information within, for example, each time slot $t_6$ at frequency slot $f_2$. Each remote unit in the wireless communication system utilizes the pilot tone within its assigned time slot to perform channel compensation and the methods described herein. So, if a single pilot tone is provided within each time slot, then each remote unit utilizes a single pilot tone in each time frame for channel compensation.

Figure 2:
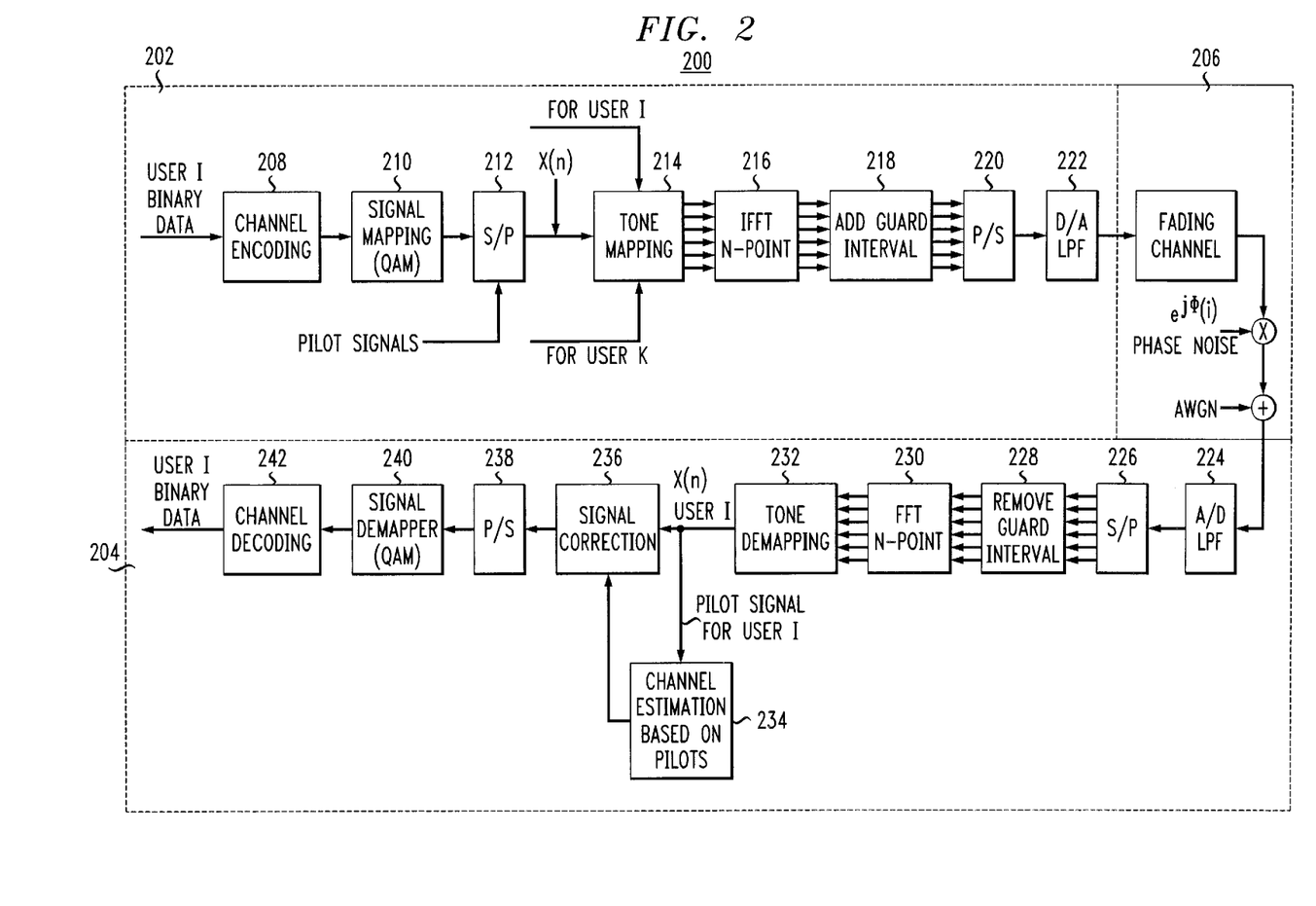
FIG. 2 is a general block diagram of processing components for an OFDM-based wireless communication system which utilizes pilot-based signal correction.

FIG. 2 shows a general block diagram 200 of an OFDM-based radio communication system which utilizes pilot-based signal correction. Diagram 200 is divided into base unit processes 202 for a base unit, remote unit processes 204 for a remote unit, and an airlink 206. In base unit processes 202, binary information data is encoded using a channel encoding process 208 and mapped into M−1 multi-amplitude multi-phase constellation symbols using a signal mapping process 210. In a serial-to-parallel conversion process 212 ("S/P"), one pilot symbol is inserted in the information data sequence for a "user i" before its data is multiplexed with other users' data. There are total M symbols for user i. A data sequence of length N from K users is converted into N parallel symbols, which are fed into an Inverse Fast Fourier Transform (IFFT) 214 from a tone mapping process 214. IFFT 214 modulates these symbols on N subcarriers and sums them. Next, a guard interval is added by a guard interval insertion process 218 and a parallel-to-serial conversion process 220 ("P/S") is applied. After digital-to-analog (D/A) conversion and filtering with a D/A converter and lowpass filter 222, the signals are upconverted to a carrier frequency and transmitted over airlink 206.

The signals over airlink 206 are received and processed by remote unit processes 204. After downconversion of the signals, lowpass filtering and analog-to-digital (A/D) conversion are applied using an A/D converter and lowpass filter 224. A serial-to-parallel conversion process 226 ("S/P") converts the signals from serial to parallel and a guard interval removal process 228 removes the existing guard interval. Data for user i is demultiplexed from the output of a Fast Fourier Transform (FFT) 230, where tone demapping is performed by a tone demapping process 232. Pilot-based signal correction is performed using a channel estimation process 234 and a signal correction process 236. Finally, M-1 information-bearing symbols are demapped and decoded into binary data by a signal demapping process 240 and a channel decoding process 242, respectively.

A collection of M consecutive sub-carriers/tones, called the transmission channel or link, is used to transmit M constellation symbols in a parallel fashion. The selection of M is based on the data rate and fading environment. It is typically chosen so that the traffic transmission channel is frequency-flat and no channel equalizer is necessary. Therefore, the transmission channel of M sub-channels is assumed as a frequency-flat channel.

Figure 3:
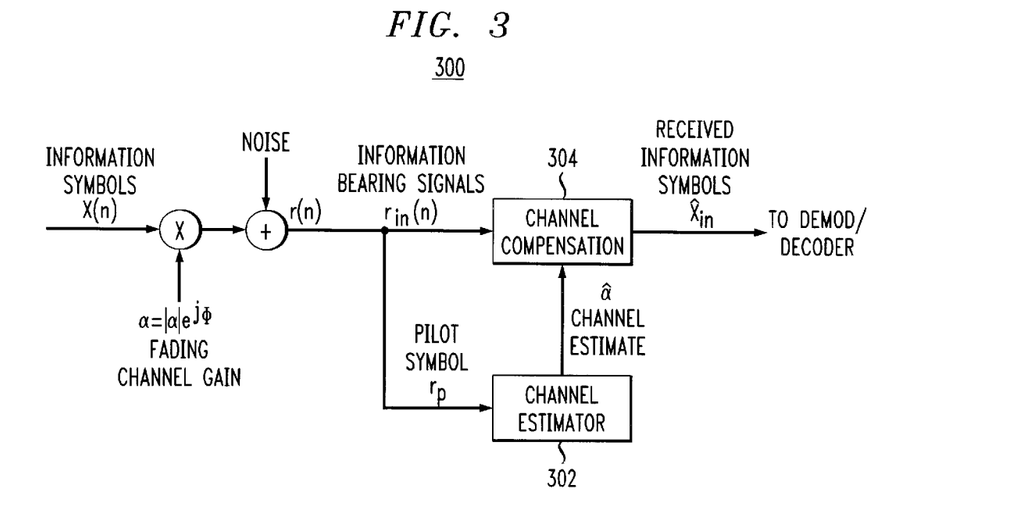
FIG. 3 is a block diagram of more specific processing components of the remote unit of FIG. 2 related to channel compensation using pilot tone symbols.

FIG. 3 shows a receiver processing portion 300 of a remote unit in wireless communication system 100 of FIG. 1. Receiver processing portion 300 includes a channel estimation process 302 and a channel compensation process 304. The following detailed signal model analysis is based on receiver processing portion 300 shown in FIG. 3.

A block of M encoded and modulated constellation symbols to be transmitted, denoted as X(n), is $$X(n) = \begin{bmatrix} S_1(n) \\ S_2(n) \\ \vdots \\ S_{M-1}(n) \\ S_P(n) \end{bmatrix} \quad \text{(Eq. 1)}$$

where n is the index for the nth block of user data and each block consists of M symbols, one of them is the pilot symbol; $S_p(n)$ is the pilot symbol inserted in the nth block of user data; and $S_1(n)$, i=1, 2, 3, ..., M-1, are information-bearing symbols in the nth block of data.

Since the channel estimation and signal correction are conducted in every individual OFDM data block, the block index n in the remaining description will be ignored. Therefore, we have $$X = \begin{bmatrix} S_1 \\ S_2 \\ \vdots \\ S_{M-1} \\ S_P \end{bmatrix} = \begin{bmatrix} X_{in} \\ S_P \end{bmatrix} \quad \text{(Eq. 2)}$$

where the information-bearing data block, $X_{in}$, is $$X_{in} = \begin{bmatrix} S_1 \\ S_2 \\ \vdots \\ S_{M-1} \end{bmatrix} = S \quad \text{(Eq. 3)}$$

The transmission channel for an individual user is considered a frequency-flat fading channel and its transfer function is modeled as a complex coefficient denoted as α(n). This is because the bandwidth which M subchannels spans is much less than the fading channel coherent bandwidth.

The receiver local oscillator (LO) phase noise has two effects on the OFDM signal. One effect is the common phase errors that are the same for all subchannels. The common phase error is, in fact, a phase shift for each subchannel and can be incorporated with fading channel phase. The second effect is a noise-like intercarrier interference (ICI). It can be treated as noise, and will therefore not be considered in the remaining description.

At the receiver side, the received signal may be represented as $$r = \alpha \cdot X + N \quad \text{(Eq. 4)}$$

and $$r = \begin{bmatrix} r_1 \\ r_2 \\ \vdots \\ r_{M-1} \\ r_P \end{bmatrix} = \begin{bmatrix} \alpha \cdot S_1 + n_1 \\ \alpha \cdot S_2 + n_2 \\ \vdots \\ \alpha \cdot S_{M-1} + n_{M-1} \\ \alpha \cdot S_P + n_P \end{bmatrix} = \begin{bmatrix} r_{in} \\ r_P \end{bmatrix} \text{ where} \quad \text{(Eq. 5)}$$

$$r_{in} = \begin{bmatrix} r_1 \\ r_2 \\ \vdots \\ r_{M-1} \end{bmatrix} = \begin{bmatrix} \alpha \cdot S_1 + n_1 \\ \alpha \cdot S_2 + n_2 \\ \vdots \\ \alpha \cdot S_{M-1} + n_{M-1} \end{bmatrix} = \alpha \cdot X_{in} + N_{in} \text{ and} \quad \text{(Eq. 6)}$$

$$N = \begin{bmatrix} n_1 \\ n_2 \\ \vdots \\ n_{M-1} \\ n_P \end{bmatrix} = \begin{bmatrix} N_{in} \\ n_P \end{bmatrix} \quad \text{(Eq. 7)}$$

$$N_{in} = \begin{bmatrix} n_1 \\ n_2 \\ \vdots \\ n_{M-1} \end{bmatrix} \quad \text{(Eq. 8)}$$

$n_i$, i=1, 2, 3, ..., M-1, and $n_p$ are AWGN with a mean of zero and a variance of $\sigma^2$. The received pilot symbol, $r_p$, is $$r_p = \alpha \cdot S_p + n_p \quad \text{(Eq. 9)}$$

Channel Estimation. Based on the received pilot symbol, $r_p$, in Eq. 9 and the previously known pilot symbol, $S_p$, the channel transfer function, α, in the nth OFDM data block can be estimated based on $$\hat{\alpha} = \frac{S_P^* \cdot r_P}{\|S_P\|^2} \quad \text{(Eq. 10)}$$

$$= \alpha + \frac{S_P^* \cdot n_P}{\|S_P\|^2}$$

$$= \alpha + \alpha_N$$

where α is the true fading channel gain or transfer function. The channel estimation error, $\alpha_N$, due to co-channel interference (CCI), AWGN, and ICI is $$\alpha_N = \frac{S_P^* \cdot n_P}{\|S_P\|^2} \quad \text{(Eq. 11)}$$

Since $S_p$ is a complex constant and its norm, $\|S_p\|^2$, is a real constant, the channel gain estimation error, $\alpha_N$, is an AWGN variable with a mean of zero and variance of $\sigma^2/\|S_p\|^2$. The mean-square-error (MSE) of the channel estimation method in Eq. 10 is $$MSE = \sigma^2/\|S_p\|^2 \quad \text{(Eq. 12)}$$

Figure 4:
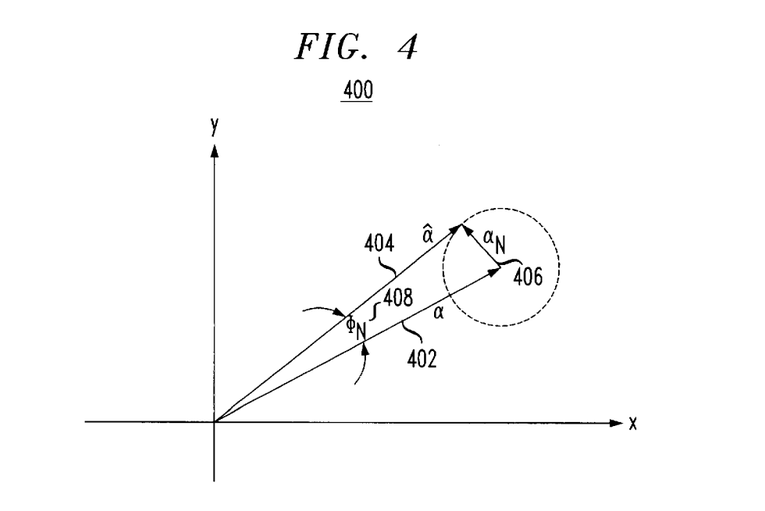
FIG. 4 is a graph showing relationships between fading channel gain, its estimation, and the estimation error for the channel compensation described in relation to FIG. 3.

FIG. 4 depicts the relationships between true channel gain (at 402), its estimate (at 404), and the estimation error (at 406). From FIG. 4, it is found that the estimated fading channel gain, $\hat{\alpha}$, can be given by $$\hat{\alpha} = (|\alpha| + \xi) \cdot e^{j(\phi + \phi_N)} \quad \text{(Eq. 13)}$$

where $\xi$ is a random variable and its value is limited as $$-|\alpha| \leq \xi < \infty \quad \text{(Eq. 14)}$$

and $\phi_N$ is a phase error variable within a small range. The $\phi_N$ is the channel phase estimation error and it is called the residual phase error (at 408).
In Eq. 13, the real channel transfer function, $\alpha$, in the nth OFDM block data, is treated as $$\alpha = |\alpha| e^{j\phi} \quad \text{(Eq. 15)}$$

Signal Correction/Channel Compensation. With the estimate of fading channel gain or transfer function in Eq. 13, the received information bearing signals are corrected based on $$\hat{X}_{in} = \frac{\hat{\alpha}^* \cdot r_{in}}{\|\hat{\alpha}\|^2} \quad \text{(Eq. 16)}$$

Substituting $r_{in}$ in Eq. 16 with the result in Eq. 6, Eq. 16 can be simplified as $$\begin{aligned}
\hat{X}_{in} &= \frac{\hat{\alpha}^* \cdot r_{in}}{\|\hat{\alpha}\|^2} \quad \text{(Eq. 17)} \\
&= \frac{\hat{\alpha}^* \cdot (\alpha \cdot X_{in} + N_{in})}{\|\hat{\alpha}\|^2} \\
&= \frac{(\hat{\alpha}^* \cdot \alpha)}{\|\hat{\alpha}\|^2} \cdot X_{in} + \frac{\hat{\alpha}^* \cdot N_{in}}{\|\hat{\alpha}\|^2} \\
&= \frac{|\alpha|}{\|\hat{\alpha}\|} \cdot e^{-j\phi_N} \cdot X_{in} + \frac{\hat{\alpha}^* \cdot N_{in}}{\|\hat{\alpha}\|^2} \\
&= \frac{|\alpha|}{|\alpha| + \zeta} \cdot e^{-j\phi_N} \cdot X_{in} + \frac{\hat{\alpha}^* \cdot N_{in}}{\|\hat{\alpha}\|^2} \\
&= \frac{1}{1 + \frac{\zeta}{|\alpha|}} \cdot e^{-j\phi_N} \cdot X_{in} + S_N
\end{aligned}$$

where the second item of Eq. 17 is due to CCI, AWGN, and ICI presented in information-bearing subchannels and it is given by $$\begin{aligned}
S_N &= \frac{\hat{\alpha}^* \cdot N_{in}}{\|\hat{\alpha}\|^2} \quad \text{(Eq. 18)} \\
&= \frac{\hat{\alpha}^*}{\|\hat{\alpha}\|^2} \cdot \begin{bmatrix} n_1 \\ n_2 \\ \vdots \\ n_{M-1} \end{bmatrix} \\
&= \begin{bmatrix} S_{N1} \\ S_{N2} \\ \vdots \\ S_{NM-1} \end{bmatrix} \text{ and}
\end{aligned}$$

$$\hat{X}_{in} = \begin{bmatrix} \hat{X}_1 \\ \hat{X}_2 \\ \vdots \\ \hat{X}_{M-1} \end{bmatrix} \quad \text{(Eq. 19)}$$

$\hat{X}_i$, i=1, 2, 3, . . . , M-1 are estimates of constellation symbols transmitted over the fading channel using OFDM signals. These estimated symbols are then demodulated and decoded to the binary data.

Effect Of Channel Estimation Error, $\alpha_N$. An estimate for an individual symbol in the nth data block is given as follows:

$$\begin{aligned}
\hat{X}_i &= \frac{1}{1 + \frac{\zeta}{|\alpha|}} \cdot e^{-j\phi_N} \cdot S_i + S_{Ni} \quad \text{(Eq. 20)} \\
&= \frac{1}{1 + \frac{\zeta}{|\alpha|}} \cdot e^{-j\phi_N} \cdot S_i + \frac{\hat{\alpha}^*}{\|\hat{\alpha}\|^2} \cdot n_i
\end{aligned}$$

The second item, $S_{Ni}$, is an AWGN variable. Eq. 20 reveals that the channel estimation error, $\alpha_N$, has two major effects on the transmitted symbols, $S_i$, i=1, 2, 3, . . . , M-1, in the nth block of OFDM data.

The first effect is that the constellation of transmitted symbols is scaled by a factor of $$1 \Big/ \left(1 + \frac{\zeta}{|\alpha|}\right)$$

instead of 1. If the channel estimation error is very small, or zero, then Eq. 20 becomes $$\hat{X}_i = S_i + \frac{\alpha^*}{\|\alpha\|^2} \cdot n_i \quad \text{(Eq. 21)}$$

However, if the channel estimation error is very large, or the channel gain, $\alpha$, is so small that the whole OFDM block signal is in deep fading and is immersed in the noise, the estimate, $\hat{\alpha}$, of the channel gain, $\alpha$, is almost zero and noise will only be obtained from the channel estimation and signal correction. Some diversities and combining techniques may be used to effectively deal with such deep fading in a wireless communication system.

The second effect is that the constellation of the transmitted symbols is rotated by an angle of $\phi_N$. Similarly, if the channel estimation error is very small, then the residual angle will become small too. Both effects degrade the mean-square-error (MSE) performance of the received constellation signals at the input of the signal demapping and decoding block. Furthermore, if a diversity and the maximum ratio combining (MRC) technique is employed at the receiver, the residual phase errors due to imperfect channel estimation in each branch will further degrade the overall system performance because the MRC requires co-phase signals from two branches of the receiver.

Residual Phase Error Estimation. The objective is to reduce the residual phase error in received constellation signals due to the pilot-based channel estimation. To reduce the effect of the channel phase estimation error on transmitted symbols, the channel phase estimation error must first be estimated and then removed from the received signals. What is described herein is a novel technique for estimating the residual phase error, $\phi_N$, and utilizing it for such correction.

In Eq. 20, the received constellation symbol after the signal correction in the transfer domain is represented as $$\hat{X}_i = \frac{1}{1 + \frac{\zeta}{|\alpha|}} \cdot e^{-j\phi_N} \cdot S_i + S_{Ni} \quad \text{(Eq. 22)}$$

-continued $$= \frac{1}{1+\frac{\zeta}{|\alpha|}} \cdot e^{-j\phi_N} \cdot S_i + \frac{\hat{\alpha}^*}{\|\hat{\alpha}\|^2} \cdot n_i$$

Using the similar method in deriving the Eq. 13, the Eq. 22 can be simplified as $$X_i = \left[\frac{1}{1+\frac{\zeta}{|\alpha|}} \cdot |S_i| + \varepsilon_i\right] \cdot e^{j(-\phi_N + \phi_i + \phi_{ai})} \; i = 1, 2, 3, \ldots, M-1 \quad \text{(Eq. 23)}$$

where $\varepsilon_i$, represents the effect of the second item in Eq. 22 on the amplitude of the ith transmitted symbol, $S_i$, and is a random variable and is confined within the following range:

$$\frac{1}{1+\frac{\zeta}{|\alpha|}} \le \varepsilon_i < \infty \; i = 1, 2, 3, \ldots, M-1 \quad \text{(Eq. 24)}$$

and $\phi_{ni}$, is due to the second item in Eq. 22. It is a uniformly distributed lo random phase variable within a small range and its mean is zero.

In simplifying Eq. 23, we used the expression $$S_i = |S_i| e^{j\phi_i} \; i = 1, 2, 3, \ldots, M-1 \quad \text{(Eq. 25)}$$

where $\phi_i$ is the phase of the ith transmitted information symbol. The total is phase of the received signal, $\hat{X}_i$, is given as $$\Phi_i = -\phi_N + \phi_i + \phi_{ni} \; i = 1, 2, 3, \ldots, M-1 \quad \text{(Eq. 26)}$$

and can be calculated based on $$\Phi_i = a\tan2(\text{imag}(\hat{X}_i), \text{real}(\hat{X}_i)) \; i = 1, 2, \ldots, M-1 \quad \text{(Eq. 27)}$$

where a tan2 is the four-quadrant inverse tangent and its output is in the interval $[-\pi, \pi]$; imag is the complex imaginary part; and real is the complex real part.

The first objective is to estimate the residual phase error, $\phi_N$, from phases of the received signals in Eq. 26. It is found that the residual phase error, $\phi_N$, is a constant for all M−1 received symbol signals. The phase errors, $\phi_{ni}$, i=1, 2, 3, ..., M−1, in Eq. 26 are due to additive white Gaussian noise and are all random variables with a zero mean. These errors can be, for example, averaged out over M−1 received signal phases.

In order to estimate $\phi_N$, it is important to know the information phase, $\phi_i$, for each transmitted symbol, $S_i$. In the embodiment described, a hard-decision slicer is employed to find each transmitted symbol with a fair accuracy based on the corresponding received constellation signal. The output of the slicer is the estimate of the corresponding transmitted symbol at the transmitter end. Due to noise, co-channel interference, and channel estimation errors, the output of the slicer is given as $$\hat{S}_i = \text{Slicer}(\hat{X}_i) \quad \text{(Eq. 28)}$$

$$= \text{Slicer}\left[\frac{1}{1+\frac{\zeta}{|\alpha|}} \cdot e^{j\phi_N} \cdot S_i + \frac{\hat{\alpha}^*}{\|\hat{\alpha}\|^2} \cdot n_i\right]$$

-continued $$= \begin{cases} S_i & \text{(Right decision)} \\ S_j & \text{(Wrong decision)}, i \ne j \end{cases}$$

where $S_i$, and $S_j$, are transmitting constellation symbols. The corresponding information phase estimate, $\phi$, is given as $$\hat{\phi}_i = \text{atan2}(\text{imag}(\hat{S}_i), \text{real}(\hat{S}_i)) \; i = 1, 2, \ldots, M-1 \quad \text{(Eq. 29)}$$

$$= \begin{cases} \phi_i & \text{(Right decision)} \\ \phi_j & \text{(Wrong decision)}, i \ne j \end{cases}$$

where, $\phi_i$ and $\phi_j$, are the phases of transmitted symbols, $S_i$ and $S_j$.

The symbol error is due to channel impairments and channel estimation errors. If the channel is very bad, the symbol error rate will be very high and therefore the slicer may not be reliable. In most situations, however, the symbol error rate is acceptable. For example, the symbol error rate is likely to be less than $5*10^{-2}$ when the slicer is employed in the embodiment described. That is, there may be one symbol error every 20 constellation symbols. Thus, for an OFDM-based system with the block size of 20, there may be one symbol error every OFDM data block. If the symbol error rate is $10^{-2}$, then there may be one symbol error every 5 OFDM data blocks. As apparent, the slicer can be used to estimate the transmitted information symbol with an acceptable accuracy.

If no symbol error occurs in the slicer, the resulting phase error is given as $$\Phi_{err}(i) = \Phi_i - \hat{\phi}_i \quad \text{(Eq. 30)}$$

$$= -\phi_N + \phi_{ni}$$

$$i = 1, 2, 3, \ldots, M-1$$

The estimate, $\hat{\phi}_N$, of the residual phase error, $\phi_N$, due to channel impairments can be calculated by averaging the phase error in Eq. 30 over M−1 received symbols based on $$\hat{\phi}_N = -\frac{1}{M-1}\sum_{i=1}^{M-1}\Phi_{err}(i) \quad \text{(Eq. 31)}$$

$$= -\frac{1}{M-1}\sum_{i=1}^{M-1}(-\phi_N + \phi_{ai})$$

$$= \phi_N \frac{1}{M-1}\sum_{i=1}^{M-1}\phi_{ai}$$

Since $\phi_{ni}$, i=1, 2, 3, ..., M−1, are random variables with zero means, the second item in Eq. 31 approaches zero when M>>1. As a result, the estimate of the residual phase error is $$\hat{\phi}_N \approx \phi_N \text{ if } M >> 1 \quad \text{(Eq. 32)}$$

Assuming that there is one symbol error and the jth transmitted symbol $S_j$ is sliced as $S_i$ i≠j, in the nth OFDM block, then the total phase error for the jth received symbol is as follows:

$$\Phi_{err}(j) = \Phi_j - \hat{\phi}_j \quad \text{(Eq. 33)}$$

-continued $$= -\phi_N + \phi_{nj} + (\phi_j - \phi_i)$$

$$= -\phi_N + \phi_{nj} + \Delta$$

where $$\Delta = \phi_j - \phi_i, j = 1, 2, \ldots, M-1 \text{ and } i \neq j \qquad \text{(Eq. 34)}$$

If $\Delta = 0$, the symbol error does not have any effect on the estimation of the residual phase error using Eq. 31. Otherwise, we have $$|\Delta| \geq \Delta_{min} \qquad \text{(Eq. 35)}$$

where $\Delta_{min}$ is the minimum phase difference between two constellation symbols if both symbols do not have the same phase. For instance, for a 16-QAM constellation, the $\Delta_{min} = \pi/8$, while for the QPSK constellation, $\Delta_{min} = \pi/2$.

Therefore, an incorrect hard-decision or a symbol error results in either a large or a small phase error for that symbol. If the maximum and minimum values (i.e., largest of the absolute values) from M phase errors in Eq. 30 are removed, and the remaining phase errors are averaged, the effect of a symbol error on the estimation of the residual phase error will be minimized. The estimate can be used to approximate the real residual phase error as reflected by $$\hat{\phi}_N \approx \phi_N \text{ if } M \gg 1 \qquad \text{(Eq. 36)}$$

Statistically, if there are two symbol errors per OFDM data block, the first two maximums and minimums (i.e., largest magnitudes) from M phase errors are ignored. Since the size of cluster M is about 20, few symbol errors do not significantly affect the estimation of the residual phase error. In fact, it is rare that there are even a few symbol errors per OFDM block.

Once the residual phase error due to the channel estimation is estimated, its effect on the received constellation signal is corrected or compensated. Since this estimation method utilizes the detected symbols, it may be referred to as the data-directed residual phase error estimation (DD-RPEE) method. The correction or compensation method based on the DD-RPEE may be referred to as the data-directed residual phase error correction (DD-RPEC) method.

Figure 5:
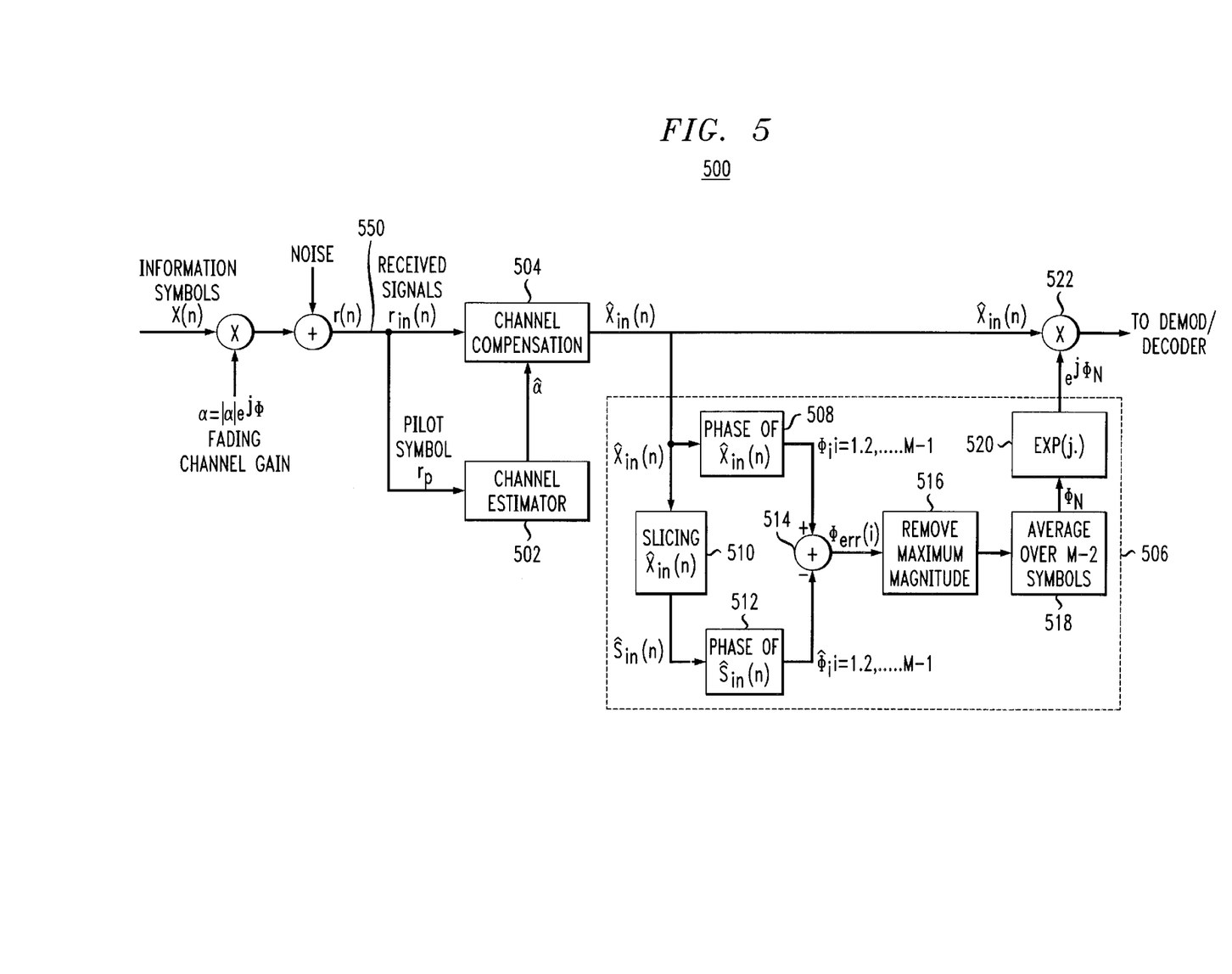
FIG. 5 is a block diagram of a first embodiment of components utilized in the remote unit of FIG. 2 which are operative to reduce residual phase error in OFDM communication signals.
Figure 6:
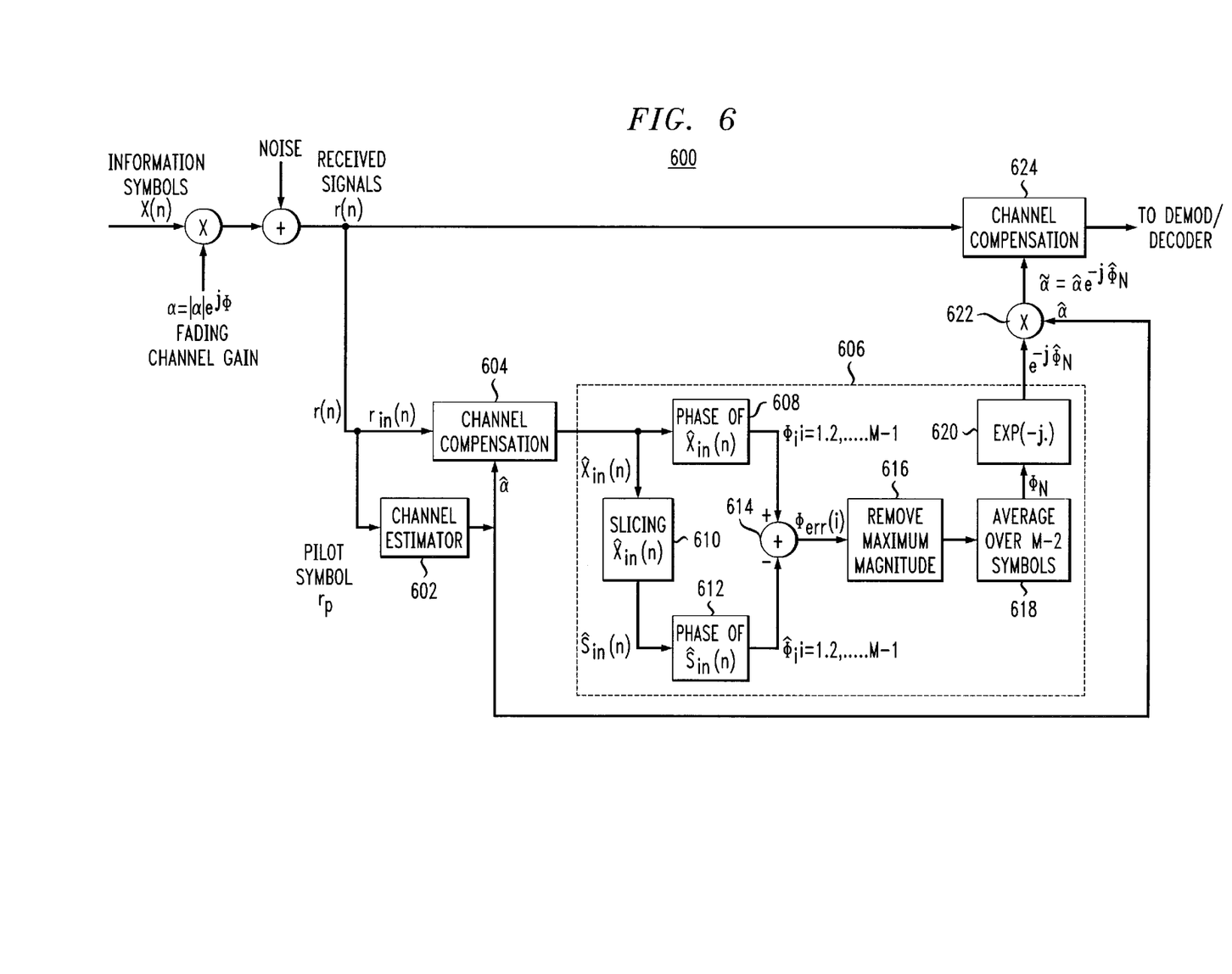
FIG. 6 is a block diagram of a second embodiment of components utilized in the remote unit of FIG. 2 which are operative to reduce the residual phase error in OFDM communication signals.

Phase Error Reduction. A residual phase error estimator and corrector, that is, the DD-RPEE and the DD-RPEC previously derived, and an OFDM-based wireless receiver having the DD-RPEE and DD-RPEC, are depicted in FIG. 5. An alternative OFDM-based wireless receiver having the DD-RPEE and DD-RPEC to reduce channel phase estimation error is depicted in FIG. 6. One or more processors may be utilized to perform the processes described, but preferably a single processor is utilized such as a single digital signal processor (DSP) to execute the appropriate steps.

More particularly, FIG. 5 shows a schematic block diagram of receiver processing components 500 of a remote unit. Receiver processing components 500 include a channel estimation process 502, a channel compensation process 504, and a residual phase error (RPE) estimation process 506. Residual phase error estimation process 506 includes a phase calculation process 508 for channel-compensated data symbols, a symbol slicer 510, a phase calculation process 512 for information symbols, a subtractor process 514, a maximum value removal process 516, an averaging process 518, and a signal correction process denoted at 520 and 522.

An alternate embodiment in FIG. 6 shows receiver processing components 600 which include a channel estimation process 602, a channel compensation process 604, and a residual phase error (RPE) estimation process 606. Residual phase error estimation process 606 includes a phase calculation process 608 for channel-compensated data symbols, a symbol slicer 610, a phase calculation process 612 for information symbols, a subtractor process 614, a maximum value removal process 616, an averaging process 618, and a signal correction process denoted at 620, 622, and 624.

The DD-RPEE and DD-RPEC will now be described in relation to the flowchart of FIG. 7 and in connection with FIG. 5. The signal is first received (step 702 of FIG. 7 and point 550 of FIG. 5). Here, the nth block of M received symbols, r(n) or r, is taken from outputs of the multiple access (FFT) block in the receiver at a time n. The nth received signal vector, r, is given in Eq. 5. Next, the fading channel gain is estimated (step 704 of FIG. 7 and channel estimation process 502 of FIG. 5). Here, the pilot tone symbol, $r_p$, in the nth received signal vector, r, is used to estimate the fading channel gain, $\alpha = |\alpha|e^{j\Phi}$. The channel estimate, $\hat{\alpha} = |\hat{\alpha}|e^{j\hat{\Phi}}$, is calculated based on Eq. 10. Next, the received signal, $r_{in}$, is corrected or compensated (step 706 of FIG. 7 and channel compensation process 504 of FIG. 5). The nth received information-bearing data block of M–1 symbols, $r_{in}$, was corrupted by the fading channel gain and noise. Step 706 corrects or compensates the signal vector, $r_{in}$, with the channel estimate, $\hat{\alpha} = |\hat{\alpha}|e^{j\hat{\Phi}}$, from step 704, based on Eq. 16. The output signal vector, $\hat{X}_{in}$, is given in Eq. 16, and it contains M–1 compensated information-bearing tone symbols which are corrupted by the channel estimation errors including channel residual amplitude and phase errors and noise.

The "core" of the phase error estimation begins in the next step. The phase of signal vector, $\hat{X}_{in}$, is calculated (step 708 of FIG. 7 and phase calculation process 508 of FIG. 5). Here, the signal vector, $\hat{X}_{in}$, has M–1 data symbols and the phase, $\phi_i$, i=1, 2, 3, ..., M–1, of each symbol is calculated based on Eq. 26. Next, the transmitted symbols are estimated (step 710 of FIG. 7 and symbol slicer 510 of FIG. 5). In this step, a hard-decision is made for each element of signal vector, $\hat{X}_{in}$, to estimate its corresponding information symbol, $X_i = S_i$ (where i=1, 2, 3, ..., M–1). The hard-decision is implemented by a corresponding constellation slicer. If no decision error occurs, the output is the symbol transmitted from the transmitter; otherwise, the output is an incorrect symbol. Next, the phases of each estimated information symbol are estimated (step 712 of FIG. 7 and phase calculation process 512 of FIG. 5). Here, the phase of the estimated information symbol, $\hat{S}_i$ (where i=1, 2, 3, ..., M–1); is calculated based on Eq. 29. Next, the information phase is subtracted from the total received signal phase (step 714 of FIG. 7 and subtractor process 514 of FIG. 5). For execution of this step, the total signal phase was given in step 708 and the phase of its estimated information symbol was given in step 712. The difference, $\phi_{err}(i)$ i=1, 2, 3, ..., M–1, between the total phase of the received signal and the phase of its corresponding estimated information symbol is calculated based on Eq. 28. If a symbol is detected with an error, the resulting phase difference is relatively large.

Figure 7:
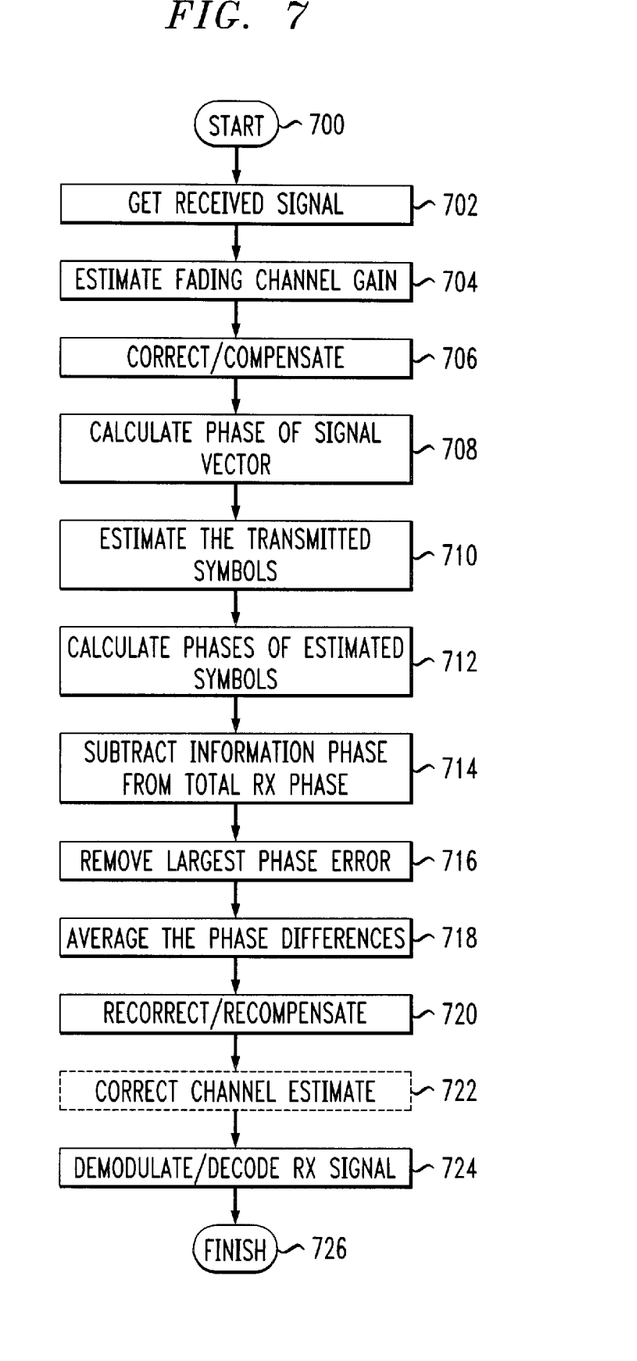
FIG. 7 is a flowchart describing a method for use in reducing the residual phase error in OFDM communication signals.

Next, the largest magnitude phase error is removed (step 716 of FIG. 7 and maximum value removal process 516 of FIG. 5). As previously described, the largest magnitude phase error corresponds to a symbol detection error. Removing the largest magnitude phase difference from M–1 phase difference variables, $\phi_{err}(i)$ i=1, 2, 3, ..., M–1, will result in an unbiased estimate of phase error. Therefore, only M–2 phase difference variables are left for next step processing.

It is noted that any suitable number of maximum values may be removed. Next, the phase differences are averaged (step 718 of FIG. 7 and averaging process 518 of FIG. 5). There are total of M−2 phase difference variables from step 716, and the average is performed over M−2 variables based on Eq. 29. The mean or the output of averaging process 518 is the estimate of the residual phase error. Finally, the signal vector, $\hat{X}_{in}$, is corrected or compensated (step 720 of FIG. 7 and blocks 520 and 522 of FIG. 5). In FIG. 5, the residual phase error in each element of the signal vector, $\hat{X}_{in}$, is removed by multiplying the received signal with the estimated residual phase error. The output will be the "clear" signal.

The channel estimate may need to be corrected (step 722 of FIG. 7 and block 622 of FIG. 6). For the alternative/extended version shown in FIG. 6, the channel estimate, $\hat{\alpha}=|\hat{\alpha}|e^{j\Phi}$, is first compensated with the estimated residual phase error, $\hat{\phi}$, based on the following equation, and then the corrected channel estimate, $\bar{\alpha}$, is used to correct or compensate (block 624 of FIG. 6) the received signal vector, $\hat{X}_{in}$, by repeating step 720:

$$\bar{\alpha}=\hat{\alpha}\cdot e^{-j\hat{\phi}} \quad (Eq.\ 37)$$

The received signal is then demodulated/decoded (step 724). The corrected received signal, based on the output of steps 720 and 722, is fed to demodulation and decoding blocks to retrieve transmitted information bits.

It should be readily apparent and understood that the foregoing description is only illustrative of the invention and in particular provides preferred embodiments thereof. Various alternatives and modifications can be devised by those skilled in the art without departing from the true spirit and scope of the invention. Accordingly, the present invention is intended to embrace all such alternatives, modifications, and variations which fall within the scope of the appended claims.

What is claimed is:

1. A method for use in reducing a residual phase error in orthogonal frequency division multiplexed (OFDM) communications signals, the method comprising:
    calculating a phase of each one of a plurality of channel-compensated data symbols to generate a plurality of data symbol phases;
    performing a hard-decision on each one of the plurality of channel-compensated data symbols to estimate a plurality of information symbols;
    calculating a phase difference between each data symbol phase and its associated information symbol phase to generate a plurality of phase differences; and
    determining a residual phase error based on the plurality of phase differences.

2. The method according to claim 1, further comprising:
    correcting phases of channel compensated data symbols based on the determined residual phase error.

3. The method according to claim 1, further comprising:
    correcting phases of OFDM communication signals based on the determined residual phase error.

4. The method according to claim 1, further comprising:
    prior to calculating each data symbol phase and generating each information symbol, performing channel compensation on OFDM communication signals using a pilot tone symbol received in the OFDM communication signals to generate the plurality of channel-compensated data symbols.

5. The method according to claim 1, wherein determining the residual phase error comprises determining the residual phase error without considering one or more of the largest magnitudes in the plurality of phase differences.

6. The method according to claim 1, further comprising:
    using the one or more phase differences to generate an average phase difference; and
    wherein determining the residual phase error comprises determining the residual phase error based on the average phase difference.

7. The method according to claim 1, further comprising:
    disregarding one or more of the largest magnitudes in the plurality of phase differences in selecting the one or more phase differences;
    using the one or more phase differences to generate an average phase difference;
    wherein determining the residual phase error comprises determining the residual phase error based on the average phase difference; an
    correcting phases of channel compensated data symbols based on the determined residual phase error.

8. A method for use in reducing a residual phase error in orthogonal frequency division multiplexed (OFDM) communication signals, the method comprising:
    generating a plurality of channel-compensated data symbols by performing channel compensation on OFDM communications signals using one or more pilot tones;
    calculating a phase of each one of the plurality of channel-compensated data symbols to generate a plurality of data symbol phases;
    performing a hard-decision on each one of the plurality of channel-compensated data symbols to estimate a plurality of information symbols;
    calculating a phase of each one of the plurality of information symbols to generate a plurality of information symbol phases; and
    calculating a phase difference between each data symbol phase and its associated information symbol phase to generate a plurality of phase differences.

9. The method according to claim 8, further comprising:
    selecting a subset of phase differences from the plurality of phase differences that do not include one or more of the largest magnitudes in the plurality of phase differences;
    using the subset of phase differences to generate an average phase difference;
    determining a residual phase error based on the average phase difference; and
    correcting phases of channel compensated data symbols based on the determined residual phase error.

10. The method according to claim 8, wherein calculating the phase of the plurality of channel-compensated data symbols is based on a four-quadrant inverse tangent function.

11. The method according to claim 8, wherein calculating the phase of the plurality of information symbols is based on a four-quadrant inverse tangent function.

12. A residual phase error (RPE) correction apparatus for orthogonal frequency division multiplexed (OFDM) communications signals, comprising:
    a first phase calculator to calculate a phase of each one of a plurality of channel-compensated data symbols to generate a plurality of data symbol phases;
    a slicer to perform a hard-decision on each one of the plurality of channel-compensated data symbols to estimate a plurality of information symbols;
    a second phase calculator to calculate a phase of each one of the plurality of information symbols to generate a plurality of information symbol phases;

a phase difference calculator to calculate a phase difference between each data symbol phase and its associated information symbol phase to generate a plurality of phase differences; and a residual phase error estimator to determine a residual phase error based on one or more of the plurality of phase differences.

13. The RPE correction apparatus according to claim 12, further comprising:

a phase corrector to correct phases of channel compensated data symbols based on the determined residual phase error.

14. The RPE correction apparatus according to claim 12, further comprising:

a phase corrector to correct phases of OFDM communication signals based on the determined residual phase error.

15. The RPE correction apparatus according to claim 12, further comprising:

a channel compensator to perform channel compensation on OFDM communication signals using a pilot tone symbol received in the OFDM communication signals to generate the plurality of channel-compensated data symbols.

16. The RPE correction apparatus according to claim 12, wherein said residual phase error estimator is further operative to determine the residual phase error without considering one or more of the largest magnitudes in the plurality of phase differences.

17. The RPE correction apparatus according to claim 12, further comprising:

a phase difference averager to use the one or more phase differences to generate an average phase difference; and wherein said residual phase error estimator is further operative to determine the residual phase error based on the average phase difference.

18. The RPE correction apparatus according to claim 12, wherein one or more processors comprise said first and said second phase calculators, said phase difference calculator, and said residual phase error estimator.

19. A residual phase error (RPE) correction apparatus, comprising:

a channel compensator to generate a plurality of channel-compensated data symbols by performing channel compensation on orthogonal frequency division multiplexed (OFDM) communications signals using one or more pilot tones;

a first phase calculator to calculate a phase of each one of the plurality of channel-compensated data symbols to generate a plurality of data symbol phases;

a slicer to perform a hard-decision on each one of the plurality of channel-compensated data symbols to estimate a plurality of information symbols;

a second phase calculator to calculate a phase of each one of the plurality of information symbols to generate a plurality of information symbol phases;

a phase difference calculator to calculate a phase difference between each data symbol phase and its associated information symbol phase to generate a plurality of phase differences.

20. The RPE correction apparatus according to claim 19, further comprising:

a selector to select a subset of phase differences from the plurality of phase differences that do not include one or more of the largest magnitudes in the plurality of phase differences;

an averager to use the subset of phase differences to generate an average phase difference;

a residual phase error estimator to determine a residual phase error based on the average phase difference; and a phase corrector to correct phases of channel-compensated data symbols on the determined residual phase error.

21. The RPE correction apparatus according to claim 19, wherein said second phase calculator is further operative to calculate the phase based on a four-quadrant inverse tangent function.

* * * * *